(12) United States Patent
Harvey et al.

(10) Patent No.: US 12,136,755 B2
(45) Date of Patent: Nov. 5, 2024

(54) FUEL CELL SYSTEM AND INTEGRATION BACK-PLANE FOR FUEL CELL MODULES

(71) Applicant: FCP Fuel Cell Powertrain GmbH, Chemnitz (DE)

(72) Inventors: David B. Harvey, Chemnitz (DE); Benedikt Eska, Chemnitz (DE); Rudolf Coerteze, Chemnitz (DE)

(73) Assignee: FCP Fuel Cell Powertrain GmbH, Chemnitz (DE)

( * ) Notice: Subject to any disclaimer, the term of this patent is extended or adjusted under 35 U.S.C. 154(b) by 334 days.

(21) Appl. No.: 17/437,933

(22) PCT Filed: Jul. 15, 2020

(86) PCT No.: PCT/EP2020/070047
§ 371 (c)(1),
(2) Date: Sep. 10, 2021

(87) PCT Pub. No.: WO2021/009259
PCT Pub. Date: Jan. 21, 2021

(65) Prior Publication Data
US 2022/0190378 A1    Jun. 16, 2022

(30) Foreign Application Priority Data
Jul. 16, 2019   (DE) .................... 10 2019 119 308.7

(51) Int. Cl.
*H01M 8/2475* (2016.01)
*H01M 8/04082* (2016.01)
(Continued)

(52) U.S. Cl.
CPC ..... *H01M 8/2475* (2013.01); *H01M 8/04201* (2013.01); *H01M 8/248* (2013.01); *H01M 8/2485* (2013.01); *H01M 8/249* (2013.01)

(58) Field of Classification Search
None
See application file for complete search history.

(56) References Cited

U.S. PATENT DOCUMENTS

2005/0202304 A1   9/2005   Peace et al.
2007/0048574 A1   3/2007   Aiello et al.
(Continued)

FOREIGN PATENT DOCUMENTS

CN   101425589   5/2009
CN   206322789   7/2017
(Continued)

OTHER PUBLICATIONS

International Search Report and the Written Opinion of the International Searching Authority for International Application No. PCT/EP2020/070047 mailed Nov. 23, 2020.

*Primary Examiner* — Lucas J. O'Donnell
(74) *Attorney, Agent, or Firm* — Warner Norcross + Judd LLP

(57) ABSTRACT

The invention relates to a fuel cell system (100) and to an integration backplane (10) for holding at least one pair of fuel cell modules (110) and at least one air module (120), said integration backplane (10) being provided with a positioning means (12) for the pair of fuel cell modules (110) and for the air module (120), such that the air module (120) can be arranged in a symmetric position with regards to, in particular between the fuel cell modules (110) of the pair of fuel cell modules (110), and said integration backplane (10) being further provided with a media and electrical interface (20), wherein the media and electrical interface (20) includes module connection ports for connecting to the fuel cell modules (110) and the air module (120). In accordance with the invention, the media and electrical interface (20) includes first air passages for the routing of air to the air module (120), module connecting air passages for the rout- (Continued)

ing of compressed air from the air module (120) to the fuel cell modules (110), and evacuation air passages for the evacuation of depleted air from the fuel cell modules (110).

15 Claims, 14 Drawing Sheets

(51) Int. Cl.
    *H01M 8/248* (2016.01)
    *H01M 8/2485* (2016.01)
    *H01M 8/249* (2016.01)

(56) References Cited

U.S. PATENT DOCUMENTS

2013/0273452 A1   10/2013   Barton
2018/0331385 A1   11/2018   Hickey et al.

FOREIGN PATENT DOCUMENTS

| JP | 2002-050391 | 2/2002 |
| JP | 5503917 | 3/2010 |
| KR | 2014-0015785 | 2/2014 |

(a) Front View (b) Back View

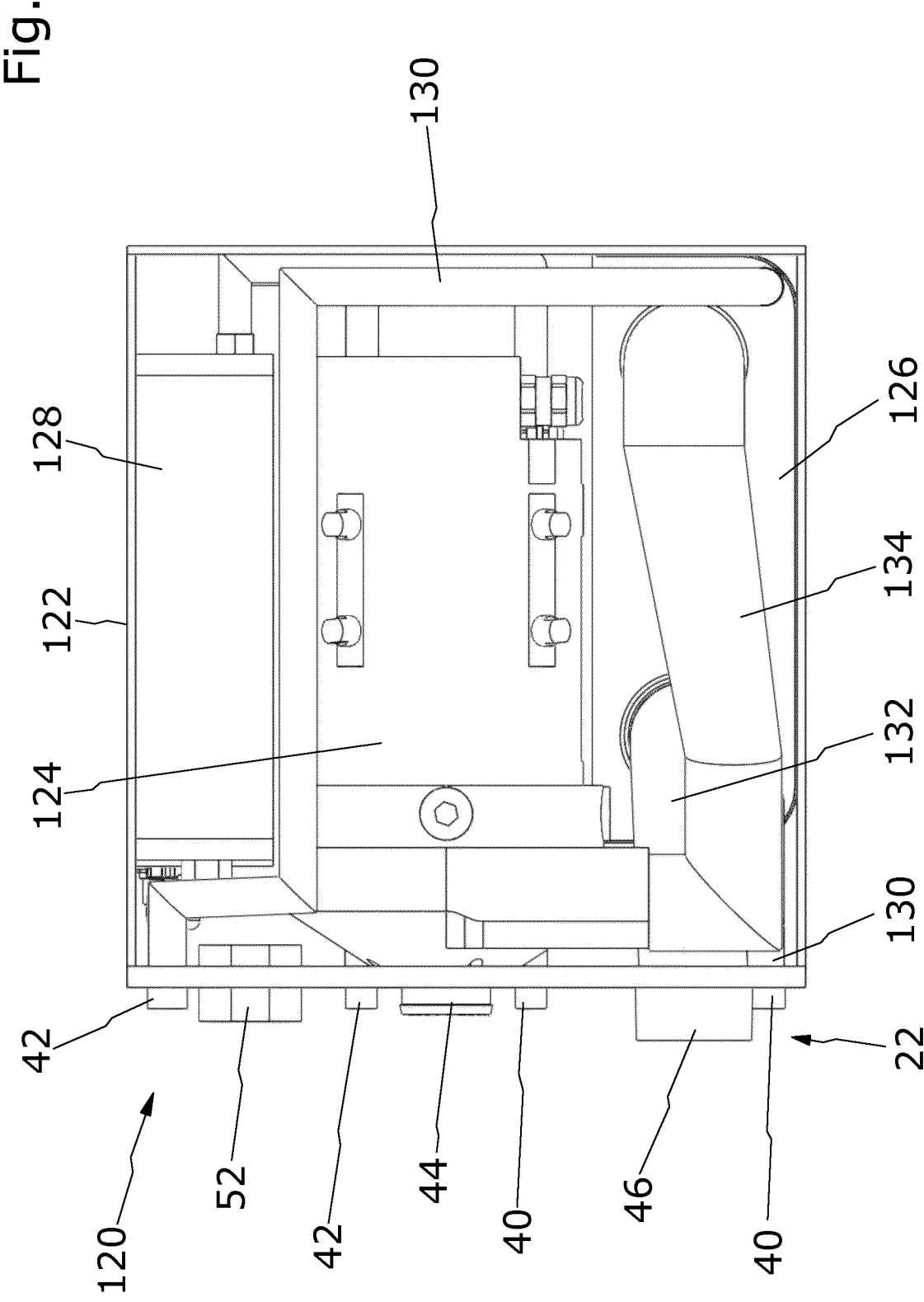

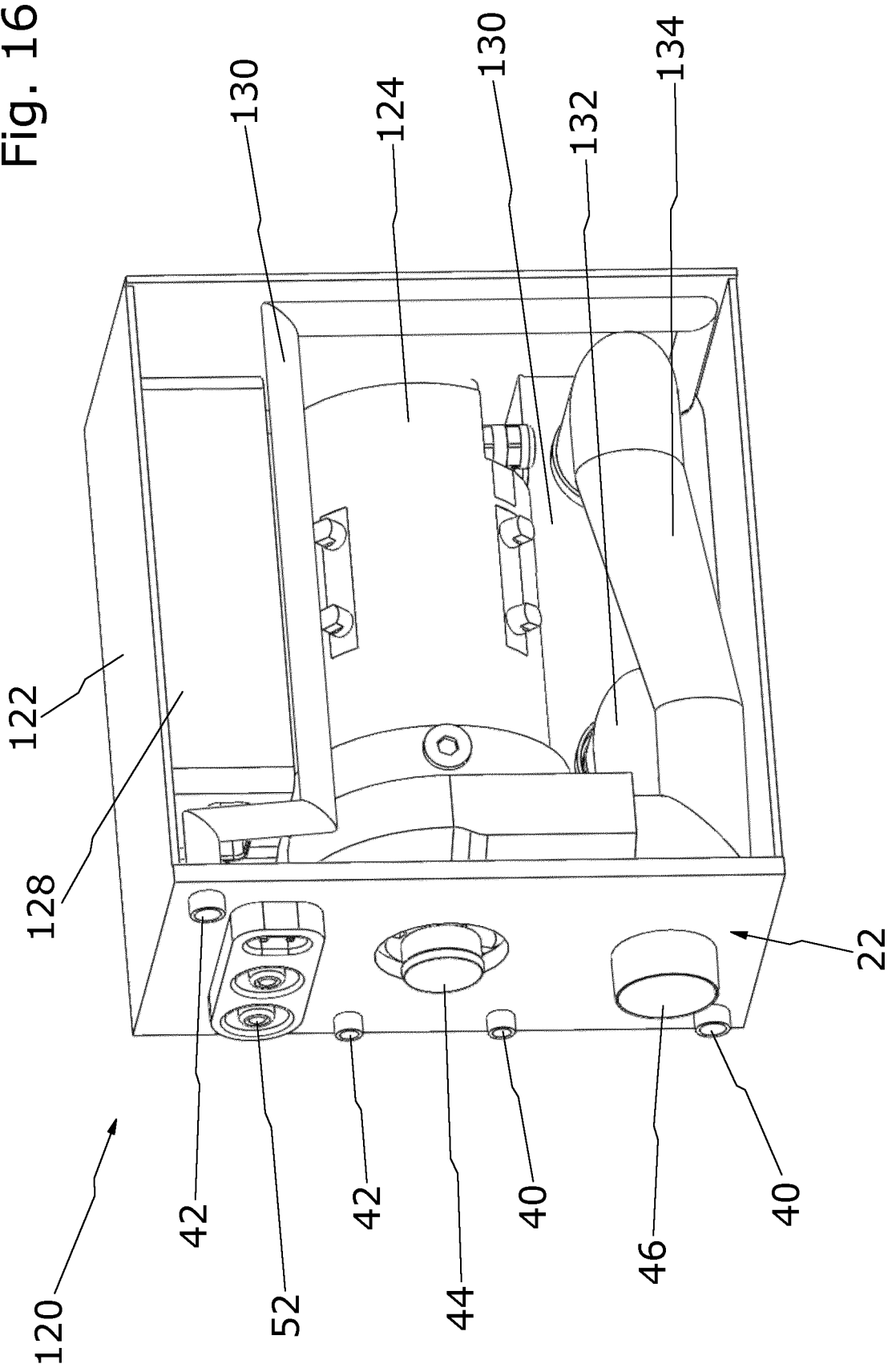

FUEL CELL SYSTEM AND INTEGRATION BACK-PLANE FOR FUEL CELL MODULES

BACKGROUND OF THE INVENTION

The invention relates to an integration backplane for fuel cell modules and to a fuel cell system. In particular, the invention relates to an integration backplane for holding at least one pair of fuel cell modules and at least one air module.

Modular fuel cell systems are known in the state of the art. In DE 10 2010 028 961 A1 a modular fuel cell system with several fuel cell units connected to a common integration backplane is disclosed. The integration backplane comprises a media channel system for the supply and discharge of process gases and a cooling medium. The individual fuel cell modules can be attached to the integration backplane by means of quick couplings, e.g. snap connections. A disadvantage of the modular system presented in DE 10 2010 028 961 A1 is that all balance-of-plant components are distributed in the space around the modular fuel cell system. In the air system, this results in an inhomogeneous pressure drop across the system.

WO 2012/150174 A1 shows a kit for a modular fuel cell device with identical module housings for different system components. In particular, oxidant supply modules and fuel cell modules are designed with the same dimensions so that they can be arranged at different locations in a system accommodating the modules, such as a vehicle. A disadvantage of the kit disclosed in WO 2012/150174 A1 is that each individual module requires its own cabling as well as its own media supply and discharge ducts with corresponding constructional expenditure.

In order to provide a modular, scalable low-cost fuel cell system which can be adapted from power levels as low as 1 kW or 2.5 kW or 10 kW up to, and potentially higher than, 600 kW a simplified modular connection system is desired.

SUMMARY OF THE INVENTION

According to the invention, an integration backplane for holding at least one pair of fuel cell modules and at least one air module is proposed. The integration backplane is provided with a positioning means for the pair of fuel cell modules and for the air module, such that the air module can be arranged in a symmetric position with regards to the fuel cell modules of the pair of fuel cell modules. In particular, the air module can in some embodiments be arranged between the fuel cell modules of the pair of fuel cell modules. The integration backplane is further provided with a media and electrical interface, which may also be referred to as MEI in the following. The media and electrical interface includes module connection ports for connecting to the fuel cell modules and the air module. Furthermore, the media and electrical interface includes first air passages for the routing of air, typically external air to the air module, module connecting air passages for the routing of compressed air from the air module to the fuel cell modules, and evacuation air passages for the evacuation of depleted air from the fuel cell modules.

The integration backplane combines a solution for the media supply, a support for the modules and may at the same time house individual balance-of-plant components.

The air module is not necessarily of the same size as the fuel cell modules. The focus of the invention lies in the optimization of the airflow. By the measures of the invention a low pressure drop between the compressor of the air module and the fuel cell stack of the fuel cell module is achieved.

The symmetric position of the air module with respect to the fuel cell modules has the advantage that no balancing means must be provided to compensate for asymmetrical piping and, thus, pressure inhomogeneity. The position between the fuel cell modules allows for less piping and low pressure loss between the compressor and the fuel cell stacks.

The design of the air module as a connectable module allows its replacement when it is out of service. The air module can be easily dismantled and cleaned, for example for service and maintenance purposes. Likewise, each fuel cell module can be easily replaced in the event of error messages.

The media and electrical interface can include balance-of-plant (BOP) components. Each balance-of-plant component located in the media and electrical interface is advantageously EMC-shielded and protected against dust and water ingress. The media and electrical interface can, for example, be manufactured in accordance with protection class IP67 or IP6K6K. Protection class IP67 is understood according to DIN EN 60529 (VDE 0470-1):2014-09. Protection class IP6K is understood according to ISO 20653: 2013. The housing of balance-of-plant components in the MEI has the additional advantage that the costs for extra housing or enclosure of the respective BOP component can be saved.

Balance-of-plant components installed in the media and electrical interface can be, in particular: humidifier, air filter, intercooler and valves from the cathode subsystem, heat exchanger, cooling pump, filter, valves and ion exchangers from the cooling circuit subsystem, and water separator, compressor, heat exchanger, valves such as, in particular, the purge valve and injector valve from the anode subsystem.

In one embodiment, the media and electrical interface provides a housing for at least one humidifier. The module connecting air passages comprise second air passages for the routing of compressed air from the air module to the humidifier and third air passages for the routing of humidified compressed air to the fuel cell modules.

In some embodiments, the evacuation air passages comprise fourth air passages for the routing of depleted wet air from the fuel cell modules to the humidifier and fifth air passages for the evacuation of excess air from the humidifier.

The humidifier, thus, does not have to be located in the air module itself. The so-called cathode path or air path, or air loop, respectively, is divided into one part in the air module and a second part in the integration backplane. Since the humidifier is located in the integration backplane, components such as the compressor and intercooler are arranged in the air module. Alternatively, the intercooler can also be located in the integration backplane.

The humidifier draws the moisture from the depleted and humidified air from the air outlet of the fuel cell module and adds it to the moisture from the fresh air drawn in externally. Examples of humidifier are well known to the person skilled in the art.

In some embodiments, the humidifier is arranged between the positions for the fuel cell modules and facing the position of the air module. It is considered as an advantage to position the humidifier opposite the air module. This arrangement results in lower pressure loss between the compressor and the fuel cell stacks.

In some embodiments, at least the second air passages, the third air passages, the fourth air passages and the fifth air passages are symmetrical with respect to the positions of the fuel cell modules.

In some embodiments, the first air passages are symmetrical with respect to the positions of the fuel cell modules.

In some embodiments, the sixth air passages are symmetrical with respect to the positions of the fuel cell modules.

The arrangements defining the symmetry in the air passages also result in lowering the pressure loss between the compressor and the fuel cell stacks.

In some embodiments, at least one of the air passages of the media and electrical interface is shaped to provide silencer functions. In particular, the air passages may be equipped with bending sections to counteract the formation of standing waves in straight sections. The advantage here is a reduction in noise development. This means that the air route is as small as possible and the air channels are designed in such a way that fewer standing waves or standing waves of smaller amplitudes are formed, and thus less resonance and noise will be generated.

In some embodiments, the media and electrical interface comprises external media connection ports. The external media connection ports may include a coolant inlet, a coolant outlet, an air inlet, an air outlet and a fuel inlet. The arrangement of the external media connection ports in the media and electrical interface allows an adaptive extension of the integration backplane especially onto similar, identically designed integration backplanes, and thus a scalability of the system from 2 to 4 to 6 and, in principle, any number of fuel cell modules.

In some embodiments, the media and electrical interface includes connection means for the current collection of the fuel cell modules. The connection means may be arranged at the same side or on different sides as the module connection ports.

The integration backplane may be provided with a mount which includes power electronics. The power electronics may be suitable for the operation of one or several compressors. In particular, the power may be used for the operation of a compressor of the air module.

The mount may include a power conversion device, such as a DC/AC or DC/DC converter or an inverter. The conversion device may be connectable to current collection means of the fuel cell modules either individually or via a common rail.

The mount may include at least one fuel cell control unit for monitoring at least one operation parameter of the fuel cell modules. Such operation parameters may include cell voltages, cell currents, cell temperatures, cell resistances, module voltages, module currents, module temperatures, module resistances, or the like. In alternative embodiments, the fuel cell modules may include fuel cell control units for monitoring the operation parameters.

The mount may be arranged opposite the modules. This makes it possible to connect the DC/AC or DC/DC converter or inverter and/or fuel cell control units to the cell modules with minimal voltage losses.

In some embodiments, the media and electrical interface includes coolant manifolds for the routing of a coolant to and from the fuel cell modules.

The media and electrical interface may include fuel pipes for the routing of a fuel such as hydrogen to the fuel cell modules. Optionally, the media and electrical interface may also include an interface for the coupling with a fuel tank outlet valve such as a hydrogen tank outlet valve. Alternatively, the fuel pipes may be routed from outside the MEI to the fuel cell modules.

In one embodiment, the media and electrical interface provides a housing for a system bypass valve which can be controlled such that each fuel cell module can be selectively activated or deactivated, or such that the pair of fuel cell modules can be deactivated. The system bypass may in some embodiments include a flow bypass to avert flow within the module when deactivated, such that the overall performance and durability of each module can be maximized. Further integrated controllers within the media and electrical interface can be configured to load balance amongst the modules.

According to the invention, a fuel cell system having the integration backplane described above is proposed. The fuel cell system has at least two fuel cell modules and at least one air module arranged on the positioning means and connected to the media and electrical interface.

In some embodiments, the fuel cell system has exactly two fuel cell modules and exactly one air module arranged on the positioning means and connected to the media and electrical interface.

Module connection is provided, for example, by mechanical connections for the assembly, gas connections, electrical connections and data communication connections. All connections may be such that the modules are interchangeable even for non-experts. In particular, quick-locking and quick-release systems may be provided.

The module connections of the media and electrical interface can, for example, be manufactured such that the fuel cell system including the integration backplane and the connected modules is in accordance with protection class IP67 or IP6K6K.

In particular, all connections may comprise sealing or sealing means on faces, edges or perimeters to allow for intrusion protection, e.g. against dust, wind, water etc.

The mechanical connections may include, in particular, bayonet couplings, plug-in snap-in couplings or similar. In particular, screws may be provided for connecting the modules to the media and electrical interface, which are inserted from the back of the modules and run through the entire module and are screwed into the media and electrical interface.

For the gas connections, preferred form-fit connecting means are provided, especially self-sealing connections. Electrical connections are preferably plug connections. All gas and electrical connections may include sealing or sealing means for intrusion protection and leak tightness, in particular the sealing may include face, edge, and/or perimeter sealings.

In some embodiments, the air module comprises at least one compressor. Typically, but not limiting, fans, screw compressors, turbo compressors, roots compressors or radial compressors may be used as compressor.

In some embodiments, the air module comprises an intercooler. The intercooler cools down the air heated by compression from the compressor to the operating conditions of the fuel cell stack.

The media and electrical interface or the positioning means may include mounting points for integration into a vehicle chassis.

In some embodiments, the fuel cell modules are of a lunchbox-type and of identical outer dimensions.

In the context of the present disclosure, a fuel cell module having an enclosure with a progressive locking system may also be called "lunchbox" enclosure.

Such a fuel cell module may have a plurality of fuel cells forming a fuel cell stack. The fuel cell module may include an enclosure which surrounds the fuel cell stack. The enclosure may include a bottom assembly and a lid cap assembly. The bottom assembly and lid cap assembly may be provided with a progressive locking system providing a range of compression pressures to the fuel cell module.

The bottom assembly may include a jacket which is at least partly form-fitted to the stack architecture providing internal alignment functions and a bottom plate in pressure contact with the fuel cell stack.

The lid cap assembly may comprise a compression plate in pressure contact with the fuel cell stack. The lid cap assembly may comprise media routing elements.

Further Aspects of the Present Disclosure

Introduction First Aspect

Packaging and integration are one of the key challenges in the deployment of the state-of-the-art fuel cell stacks and systems. Conventional or state-of-the-art stack technology employs a configuration which includes a MEA sandwiched between a pair of bipolar flow field plates; which for one skilled in the art, is commonly referred to as the unit cell. The MEA may comprise one or more layers including a first gas diffusion layer (GDL), an anode, an anode catalyst, a polymer membrane (PM), cathode catalyst, a cathode and a second gas diffusion layer (GDL). Typically, the MEA will include all of these layers, which is, however, not limiting the invention. The unit cell is then stacked in a series to form an assembly of unit cells. This assembly of unit cells is then sandwiched between a set of compression hardware and a media plate, or in some cases a compression hardware with an integrated media plate, in order to form the fuel cell stack. The assembly of this unit can present challenges in high volume manufacturing due to alignment of the individual parts and the ability to the hold the alignment during the affixation of the media plate and compression hardware depending on the number of unit cells determined for the final stack configuration.

Disclosure First Aspect

In order to simplify and reduce the cost of the overall stack assembly, a novel enclosure is proposed. In the preferred embodiment, the enclosure consists of a bottom formed assembly that is form fitted to the stack architecture providing internal alignment functions. The center mounting plate, during assembly, provides motion so that the exterior jacket of the enclosure provides alignment during the stack assembly and the jacket is raised as the stack height increases during the assembly process. Upon reaching full height, the bottom plate meets the fixation points with the aligning exterior jacket and lock in position.

A second component of the enclosure is a lid cap system. The lid cap system has an embossed integrated compression plate and, in some embodiments, a partial jacket. The compression plate, in some embodiments, and the jacket, in alternate embodiments, contains a locking system that will result in the bottom enclosure jacket locking into the top lid cap system. The lid cap system will follow the alignment guides of the external jacket and additionally may provide its own additional alignment guides during joining.

Upon joining the lid cap system will, through the locking system, be inserted or join with the bottom jacket such that a small amount of pre-compression is applied to fix the entire stacked assembly in place; this pressure will not be the final fuel cell pressure but only a stabilizing clamping force which is used to hold the alignment and maintain the stack stability for the purposes of pre-assembly and storage of assembled enclosures until the desired time of use.

The fixation of the assembly can be done, as in one embodiment, with a progressive locking system in which the locking steps are chosen to provide a range of compression pressures. Internally, in one embodiment, the lower fixation plate may accommodate displacement to allow the compression pressure of the stack to remain consistent while the stack assembly grows and shrinks based on various physical phenomena familiar to an individual skilled in the art.

A variation of these embodiments is shown in FIGS. 1 and 2. FIG. 1 depicts a lunchbox enclosure with one set of possible embodiments for external ratcheting, porting and external electrical connections.

FIG. 2 depicts a cross section of a lunchbox enclosure showing one possible embodiment for the internal compression and porting block, alignment features for the stack assembly, and a port configuration for a U-flow arrangement.

Internally; either the bottom mounting plate or the top lid cap, or both, contain media pathways to connect the hydrogen, air, and cooling fluid from the exterior media interface of the enclosure to the collection of unit cells within. The media ports and interfaces within may, in one embodiment be designed in a way so as to provide locating overlap in order to minimize the tolerance alignment issues that arise during stack assembly. The external media interfaces will be centralized at or distributed around the cell enclosure. The centralization of the external media interfaces, in one embodiment, will be done to allow for the connection of the assembled "lunch box" enclosure to an integrated media backplane which allows for the connection of multi-"lunch box" enclosures into a common set of manifolding for hydrogen, air, and cooling, fixed mounting locations, and common power collection (which in one embodiment can be done through a common bus, while in another embodiment is done through a series of separate buses connected to a power conversion device integrated into or separately mounted with the Backplane).

In an alternate embodiment, the media interface on the enclosures are designed in a manner such that the enclosures fit together, like Lego blocks, and their linkage forms an integrated media backplane. Each enclosure may include integration of passive humidification, exterior jacket circulating coolant flow, integration of power conversion devices tailored to the power level of the individual power of the individual stack within the enclosure, and independent fuel cell controllers which are multi-unit capable. When the connections are formed enclosure to enclosure, the media routing within the enclosure can be configured to be in a cascade format or alternately as a manifold with parallel connections to each of the stacks enclosed within the individual enclosure units.

The proposed solution allows for a minimization of piping and connectors, improves serviceability of the system, provides a more compact and simplified packaging for the stack, and allows for stable pre-compression of the stack prior to final full compression done prior to commissioning.

Introduction Second Aspect

In order to provide a modular, scalable low-cost fuel cell system which can be adapted from power levels as low as 1 kW or 2.5 kW or 10 kW up to, and potentially higher than, 600 kW a simplified modular connection system is desired.

Disclosure Second Aspect

Based on the "lunchbox" fuel cell module concept described above, an integration backplane is proposed.

The integrated backplane provides a plug-in type concept where the "lunchbox" enclosures are plugged into the media couplings of the integrated backplane. The integrated backplane includes an integrated air and coolant pathway; and in some embodiments an integrated hydrogen pathway.

One embodiment of the stacking arrangement is shown in FIGS. 3 and 4. FIGS. 3 and 4 show front and back views of lunchbox arrangement and porting as the stacking and plug-in concept for the integrated backplane.

The backplane can be one entire unit or it, itself, can be assembled in modules that scale the number of possible module connections. The backplane shall provide the incoming flow for air and coolant and the collection and extraction of the used flows to an interface exiting the backplane either to the ambient environment or to other sub-system which the fuel cell system must be connected to, such as a vehicle radiator.

In one embodiment, as the incoming and exiting air flows are contained within the integrated backplane, the backplane may contain an integrated humidifier or a series of integrated humidifiers. These integrated humidifier(s) will work according to their physical principals and be integrated to ensure that these functions are met which is well understood by a person skilled in the art.

The backplane will include mounting points for integration into the vehicle chassis and in some embodiments the backplane will include a coupling interface at which the compressor, coolant pump/radiator outlet, and/or hydrogen tank outlet/low pressure regulation valve can be connected.

In some embodiments, the compressor inputs can be directly on the back nearest the modules where the compressor can in some embodiments be directly integrated on the backplane. In all embodiments, the number of air supplies, e.g. air supplies including compressors can be a few as one or be up to twice the number of integrated modules.

The hydrogen supply connections can be done by a central manifold with the modules connected by fixed ports and also, in some embodiments, by a central manifold with the modules connected by hoses either rigid or flexible.

The integrated backplane may include an integrated bus system which is used to connect all of the individual modules together and, in alternate embodiments, a power conversion device may be integrated directly into the backplane such that the power conversion device takes input from each module and power balances between them.

Each module within the backplane can have a central controller unit or, in some embodiments, a single controller unit can be integrated into the backplane with a sub-controller integrated into the sub-modules that provides the functionality of expandability and adaptability as new modules are introduced.

The integrated backplane can be laid out in a planar layout with the back placed in any orientation.

In all embodiments, the orientation of the stack can be adapted such that the orientation of the individual modules can be adjusted such that the most desirable orientation with the direction of the force of gravity is achieved.

In all embodiments, the connections between the individual modules and the backplane are affixed such that the length of tubing and/or direct connections are minimized in order to minimize the pressure losses within the total system.

The module controllers, and in some embodiments, the integrated controller within the backplane can be configured to either load balance amongst the modules or to selectively activate and deactivate specific modules, with the latter methodology combined in some embodiments with a flow bypass to avert flow within the module when deactivated, such that the overall performance and durability of each module can be maximized.

Introduction Third Aspect

In state-of-the-art fuel cell systems, traditional control architectures rely on the use of an array of sensors located in the air, hydrogen, humidification, and cooling loops. Further sensors are also included for monitoring the stack and these sensors are either integrated within the stack or located on the exterior of the stack components. All of these sensors are then used in combination with a control computer which takes the input values from the sensors and uses either empirical or semi-empirical models or a series of pre-loaded lookup tables in order to determine the appropriate input response to the controllers within the fuel cell system which regulate the incoming flow of hydrogen, air, coolant, or humidification of the incoming reactant streams.

This state-of-the-art fuel cell control architecture in general is costly due to the high number of sensors within the system and also very rigid in that it lacks adaptability in addressing operational conditions that are outside of the pre-determined boundaries of the programming. Additionally, there is a cost of development burden for systems of this traditional type of architecture as they require significant effort, time, and test articles in order to characterize the extents of the stack operation un-der the widest range of potential operating scenarios which might be expected to be encountered by the fuel cell system.

Disclosure Third Aspect

In order to address the shortcomings of the state-of-the-art approaches for fuel cell system control architectures while also reducing the overall cost of the fuel cell system a self-learning, artificial intelligence-based Fuel Cell Control System is proposed. This system eliminates the vast majority of sensors thereby reducing cost and introduces the use of a self-learning, artificial intelligence algorithm to provide a high degree of adaptability and optimization based directly on the operating environment and requested duty cycle that the fuel cell system is subjected to.

The ability to control the system and provide input to the air, hydrogen, and cooling loop regulating controllers is still required. In order to provide the control capability, low cost voltage monitoring is implemented into the stack.

In one embodiment, the integrated voltage monitoring is done through the use of a low cost metal pin type connector integrated into a slot on the plate, while in another it is accomplished through the integration of a wireless sensor or RFID tag integrated into the flow field plate, and, in yet another method, it is accomplished through the use of a roll-on voltage sensor affixed to the stack exterior edge via an adhesive where the voltage sensing is accomplished either through measurements of the external field or through direct contact with the conducting materials.

To further enable the self-learning, artificially intelligent control architecture; a high frequency measurement capable device may be integrated into the control board or DC/AC or DC-DC converter or inverter for the system. The high frequency measurement capable device allows the in-situ collection of the frequency response spectra related to the hydration of the materials within the stack.

In the operation of a fuel cell, understanding the input and response behavior is critical and in the state-of-the-art this is accomplished through the use of many sensors and a series of underlying models and/or look-up tables. However, the most direct response for the state of the stack and the individual cell therein is in fact the stack and cell voltages, respectively. The stack and cell voltages provide a direct one-to-one response to the in-situ operating conditions or duty-cycle in which the fuel cell stack is operating; however, based on the complexity in the underlying physics, the ability to interpret the response is significantly complicated and not easily deconvoluted.

In order to achieve the reduction or elimination of the sensor within the system and enable a self-learning, artificially intelligent control system the knowledge of the cell voltage, overall stack voltage, and the current state of hydration in the stack is needed. Using the embodiments outlined above for the collection of cell-based voltages and the high frequency resistance, a control algorithm for the self-learning, artificially intelligent control architecture is proposed.

Specifically, the use of different waves forms on the control side can be used to perturbate the input signals to the individual controllers for the air, hydrogen, cooling, and humidification (if included) loops. This perturbation can be done individually on the respective loops or simultaneously on all loops but using a different perturbation frequency. During the control perturbation of the loops, the cell voltage, stack voltage, and high frequency response will be collected. The response of the cell voltage and stack voltage is then used to determine whether the response is positive in improving the performance or negative by reducing the performance.

The collection of the high frequency resistance is used to determine the state of hydration connected with the set operating points such that the system hydration can be controlled to prevent dry-out and flooding. Additionally, the state of hydration can be used in combination with the cell voltage to tailor operating conditions during startup and shutdown for conditions such as sub-zero operation.

Based on the individual improvement or collective improvement, the direction of optimal perturbation is obtained and the process repeated in order for the system to settle into the optimal configuration point for that set of operating demands and conditions.

Further, in other embodiments, various forms of global optimization and local optimization algorithms, that are common for those skilled in the art, can be applied in order to accomplish the same perturbation-based optimization. As the optimization is completed, the artificially intelligent system tracks and monitors the operating points, the set conditions, and the resulting optimal performance. This tracking includes storage locally within the fuel cell control unit and, in other embodiments, the upload of such data to a central database or localized database for reference access by the fuel cell controller but also by other fuel cell controller units world-wide or regionally.

Through the use of the stored data, the artificially intelligent system can learn and apply the data to enhance the optimization over time, track and control the stack response over the course of aging in order to tailor the system loop input behavior thus maximizing stack lifetime, and minimizing the perturbations necessary around the core operating points which allows lighter duty monitoring and perturbation to be accomplished instead on the fringe boundary points.

Through the use of connectivity between units, whether directly or through cloud or through a centralized database; individual units can be optimized using the control algorithm response learned by the artificially intelligent controller of other units thus creating a collective or hive optimization either locally, regionally, or world-wide.

The use of the self-learning, artificially intelligent control system also provides an elimination or minimization of the factory acceptance testing and/or stack conditioning necessary in the field as the perturbation and learning algorithm is in essence an on the fly artificially intelligent optimization control unit. This allows the system to perform in field conditioning and control behavior based on the progressively changing cell response during the initial stack break-in or conditioning period. The elimination or minimization of stack factory acceptance testing and/or stack conditioning prior to deployment of the fuel cell stack to the desired application results in a significant reduction in the overall cost of the fuel cell system.

In variants of the embodiments, the self-learning, artificial intelligent algorithm can be employed to either optimize performance or minimize the degradation rate; or in blended mode, optimize and balance both for a blended value-based optimization.

Such that the learning algorithm can be tasked also with lifetime optimization through the selection of operating conditions which minimize the degradation rate per unit time on a cell-based and/or stack basis.

BRIEF DESCRIPTION OF THE DRAWINGS

FIG. 15 is a side view of the air module of FIG. 14 with the housing open.

FIG. 16 is a perspective view of the air module of FIG. 14 with the housing open.

DESCRIPTION OF THE DRAWINGS

Figure 1:
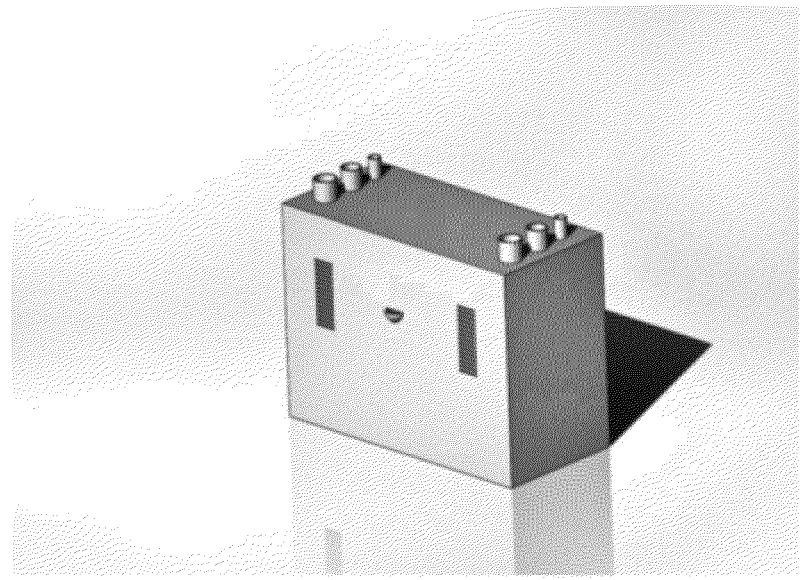
FIG. 1 is a perspective view of a lunchbox enclosure according to an embodiment of the invention.

Hereinafter, embodiments of the invention are described in greater detail with reference to the drawings. The embodiments are not to be interpreted as limiting the subject matter of the invention. Many modifications and combinations which are not shown in the drawings will be apparent to a person skilled in the art on the basis of his technical knowledge.

In the drawings, the same reference signs are used to identify the same elements or elements which are similar in their function. Repetitive statements are avoided, if possible.

FIG. 1 depicts a lunchbox enclosure with one set of possible embodiments for external ratcheting, porting and external electrical connections.

Figure 2:
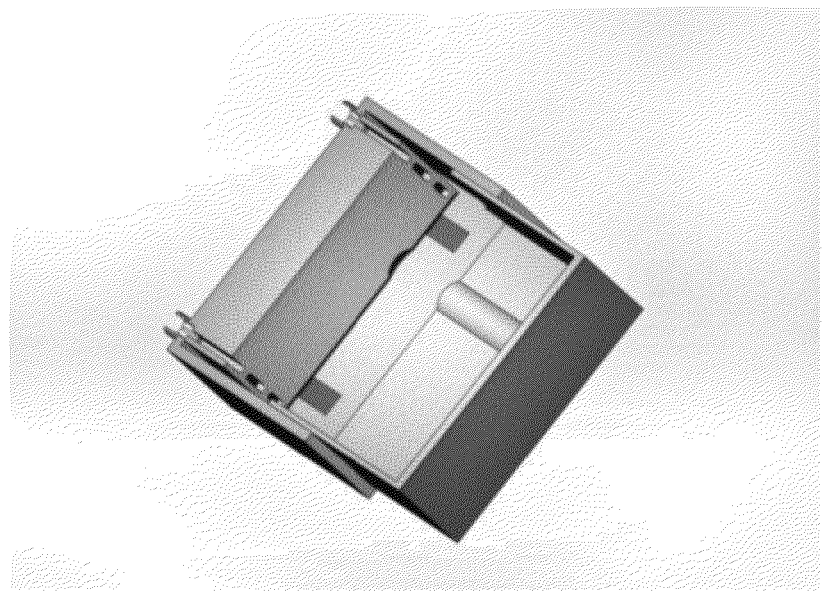
FIG. 2 is a cross-section of a lunchbox enclosure according to an embodiment of the invention.

FIG. 2 depicts a cross-section of a lunchbox enclosure showing one possible embodiment for the internal compression and porting block, alignment features for the stack assembly, and a port configuration for a U-flow arrangement.

Figure 3:
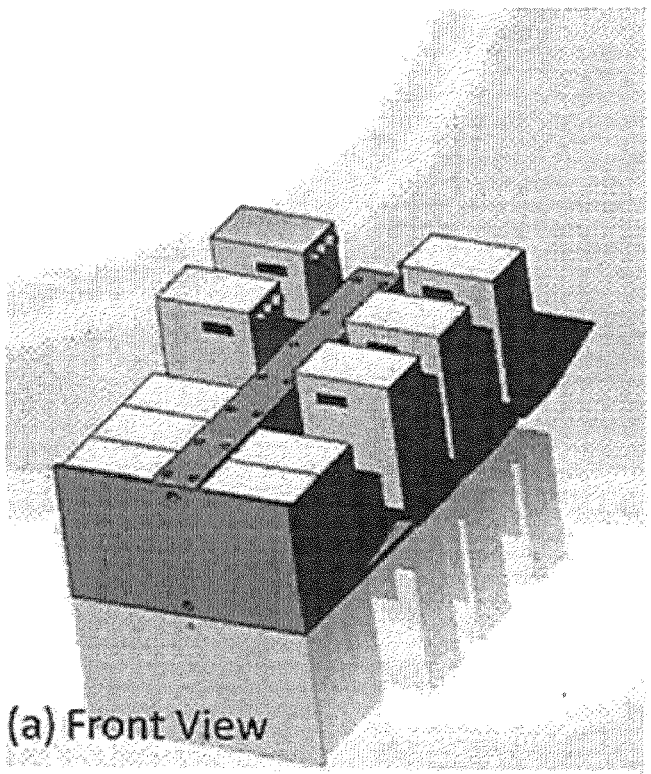
FIGS. 3 and 4 provide perspective views of a system with integrated backplane and lunchboxes arranged thereon.
Figure 4:
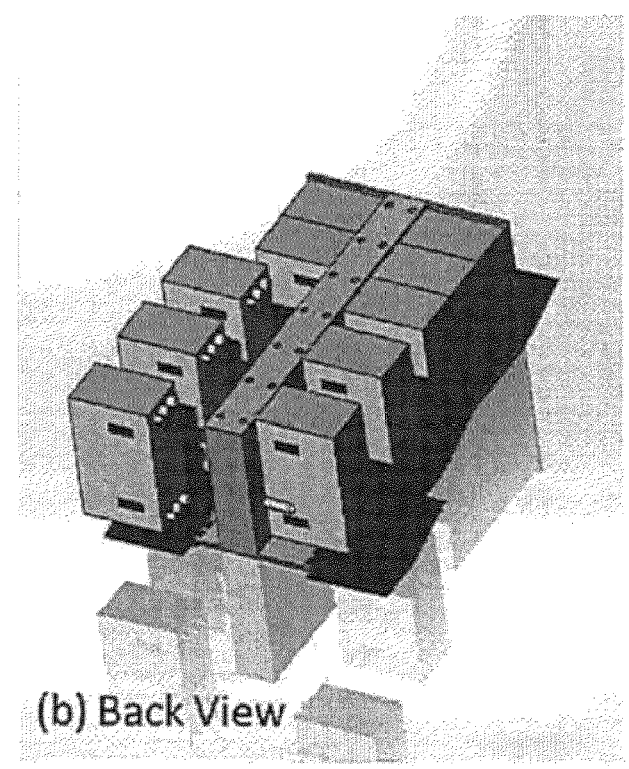

One embodiment of the stacking arrangement is shown in FIGS. 3 and 4. FIGS. 3 and 4 show front and back views of lunchbox arrangement and porting as the stacking and plug-in concept for the integrated backplane.

Figure 10:
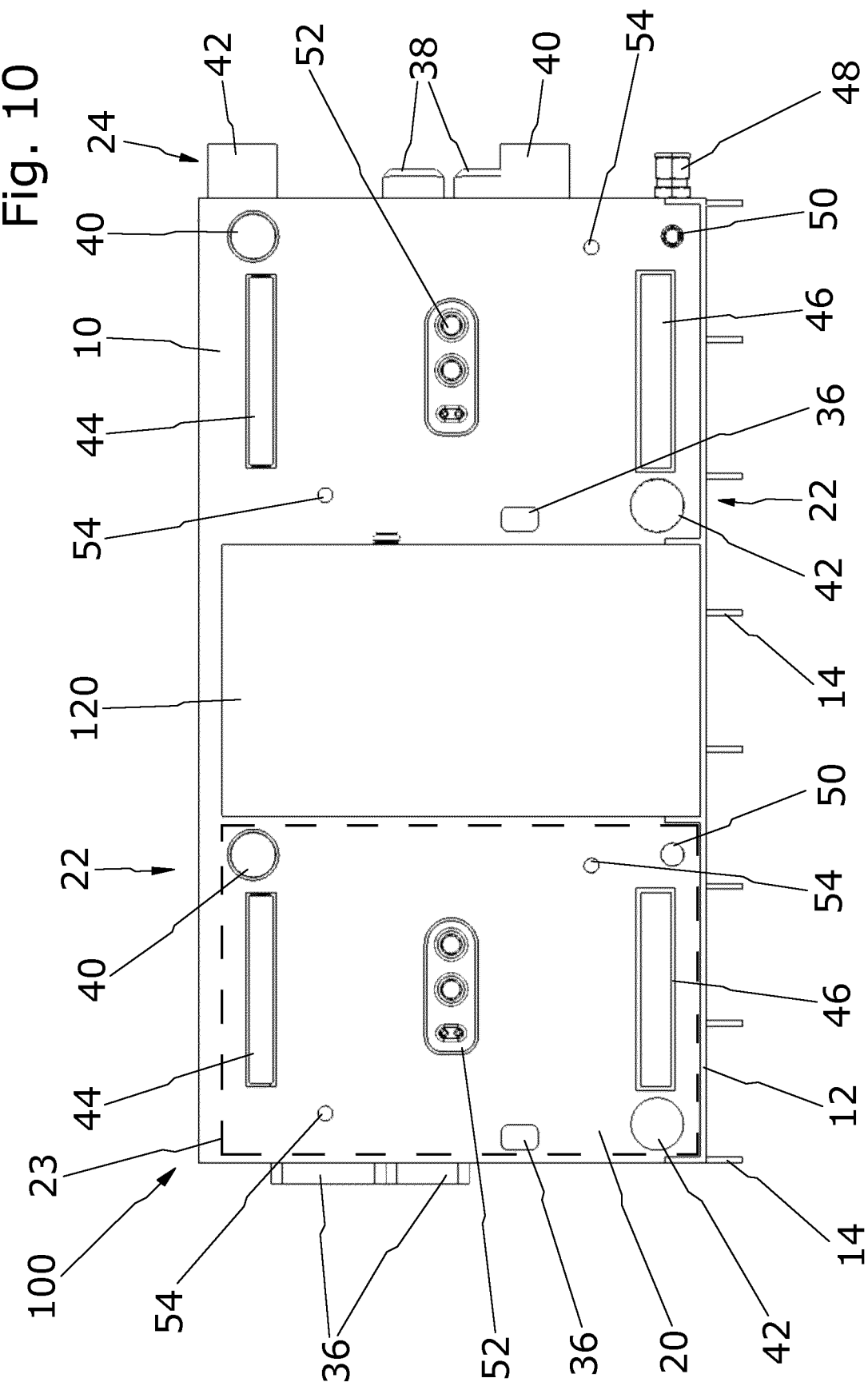
FIG. 10 is a front side view of the fuel cell system in FIG. 5 without the fuel cell modules.
Figure 11:
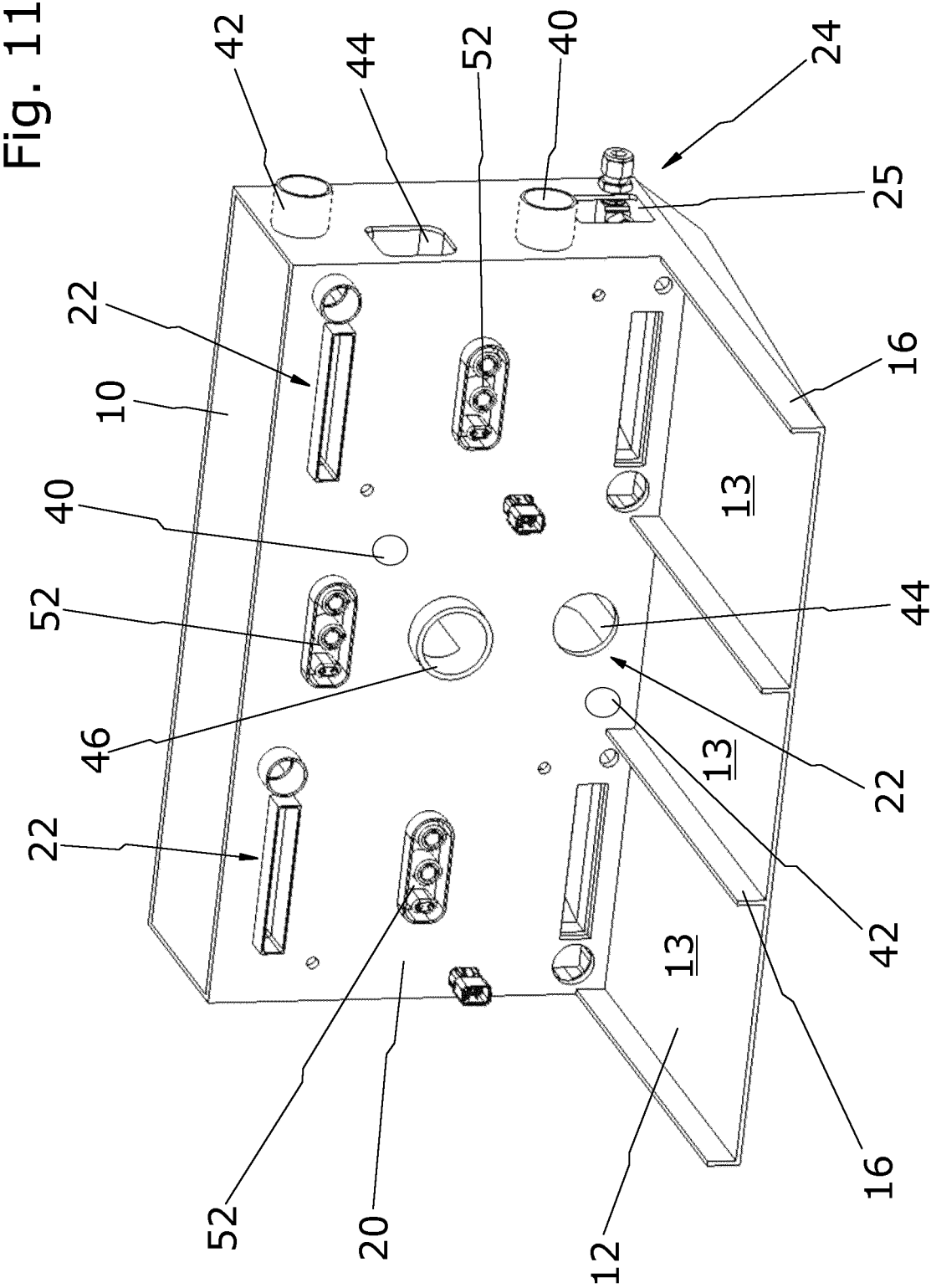
FIG. 11 is a perspective view of the integration backplane of FIG. 5 without the fuel cell modules and without the air module.
Figure 12:
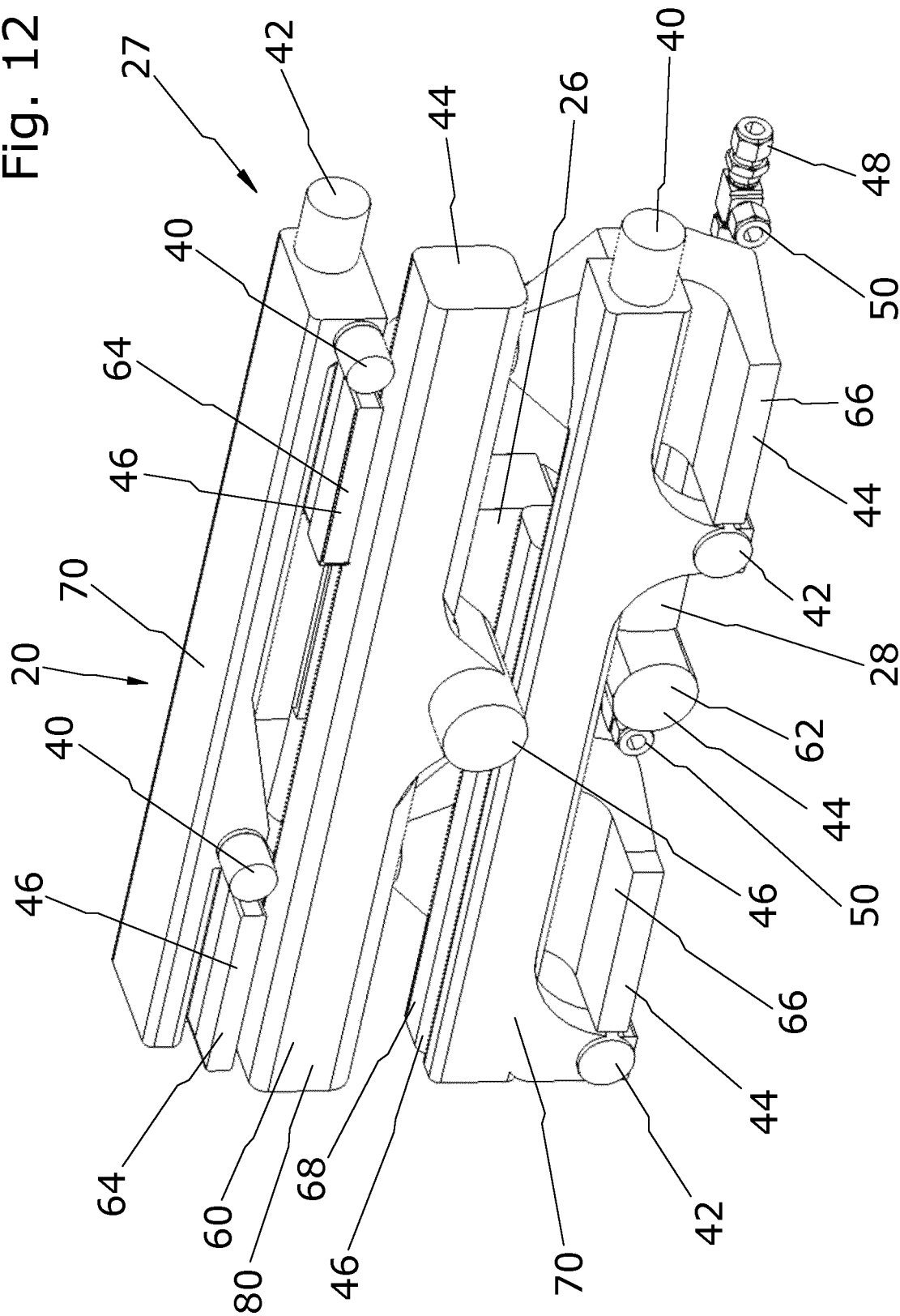
FIG. 12 is a perspective view of the inside of the MEI of the fuel cell system of FIG. 5.
Figure 13:
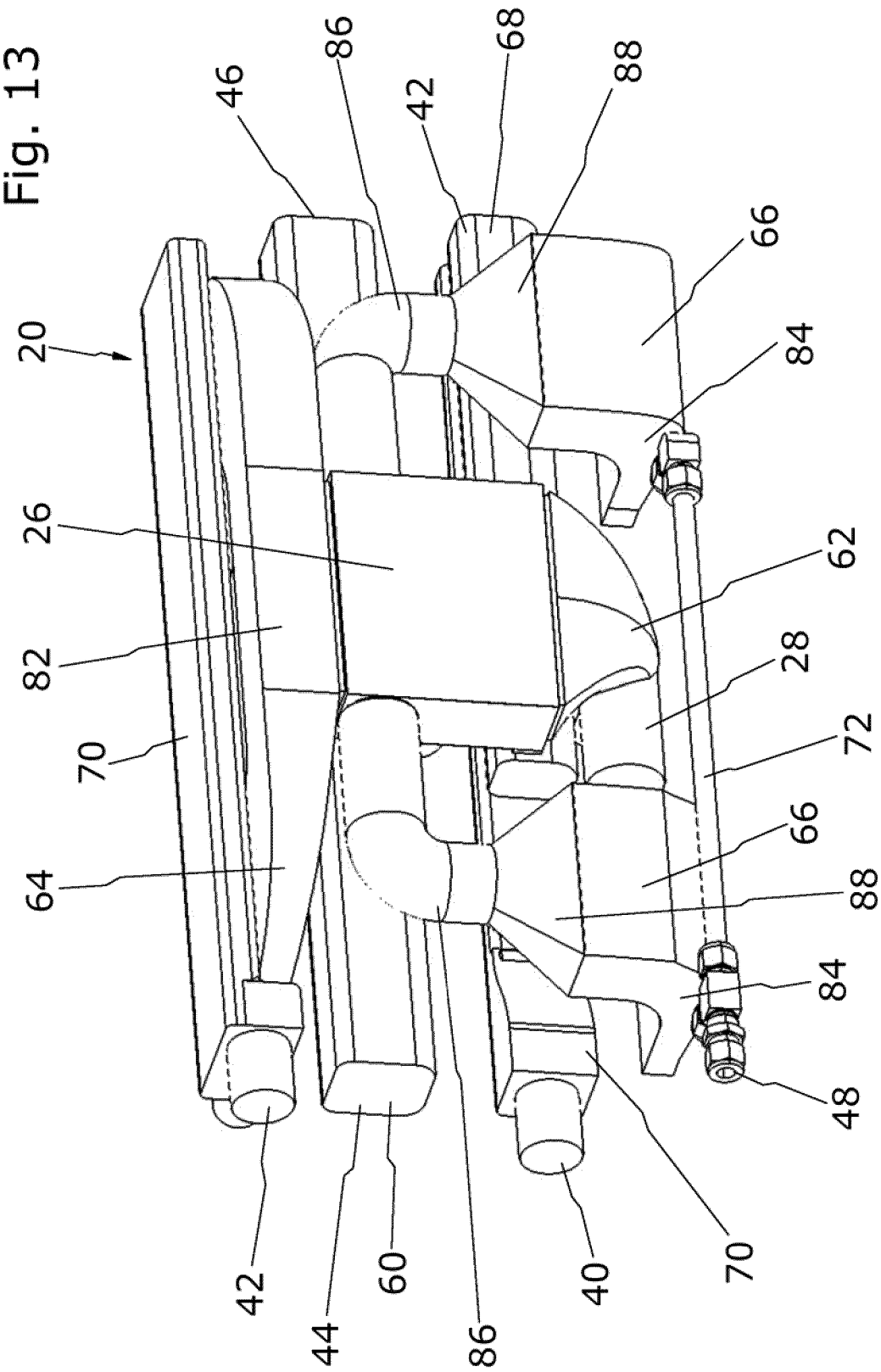
FIG. 13 is another perspective view of the inside of the MEI of the fuel cell system of FIG. 5.
Figure 14:
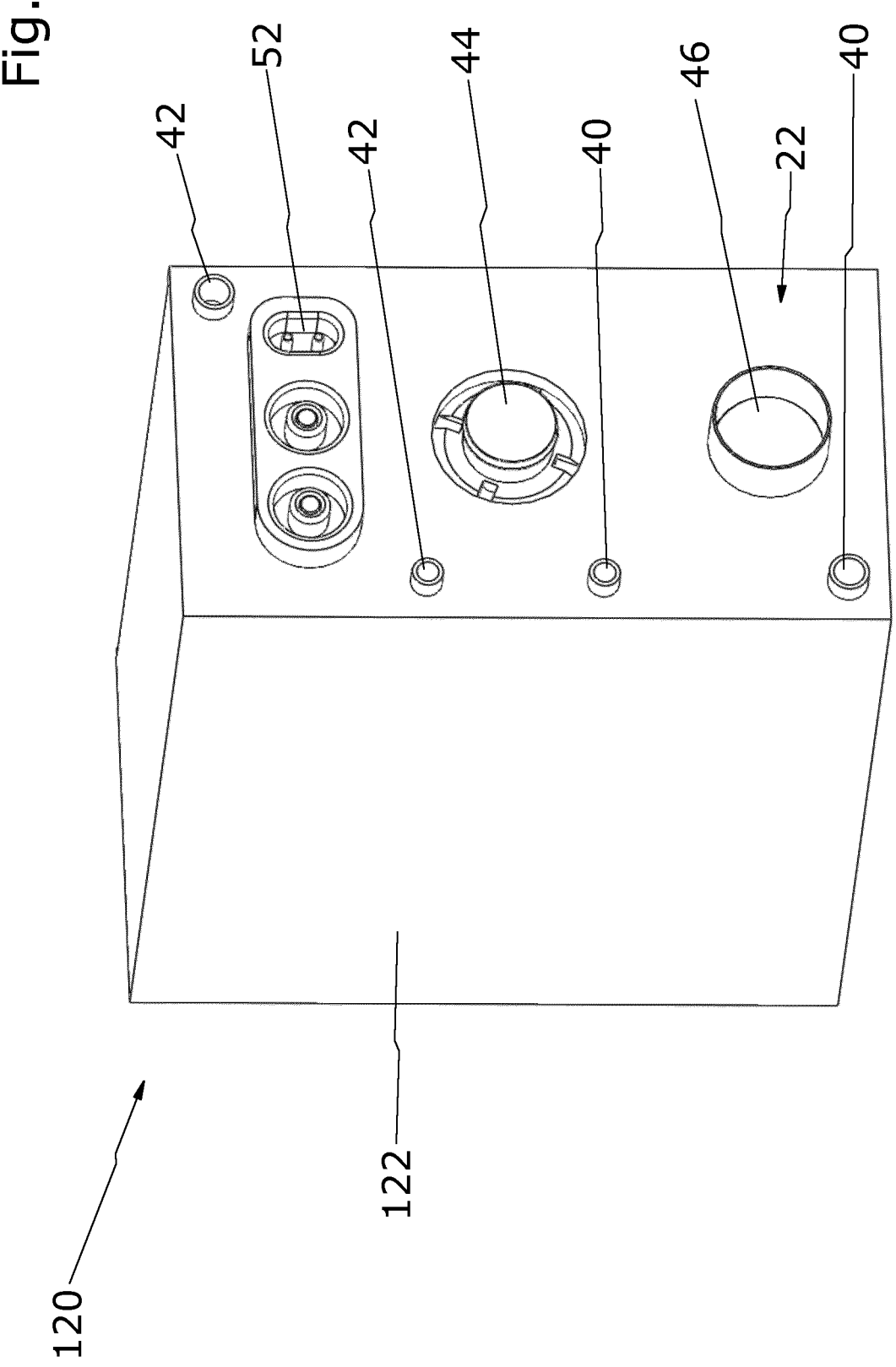
FIG. 14 is a perspective view of the air module of the integration backplane of FIG. 5.

FIGS. 5 to 9 show different perspectives of the fuel cell system 100. FIGS. 10 and 11 show how the fuel cell modules 110 and the air module 120 are connected to the integration backplane 10. FIGS. 12 and 13 show the interior of the media and electrical interface (MEI) 20, with the housing of the MEI 20 omitted for ease of understanding. FIGS. 14 to 16 show the air module 120.

Figure 5:
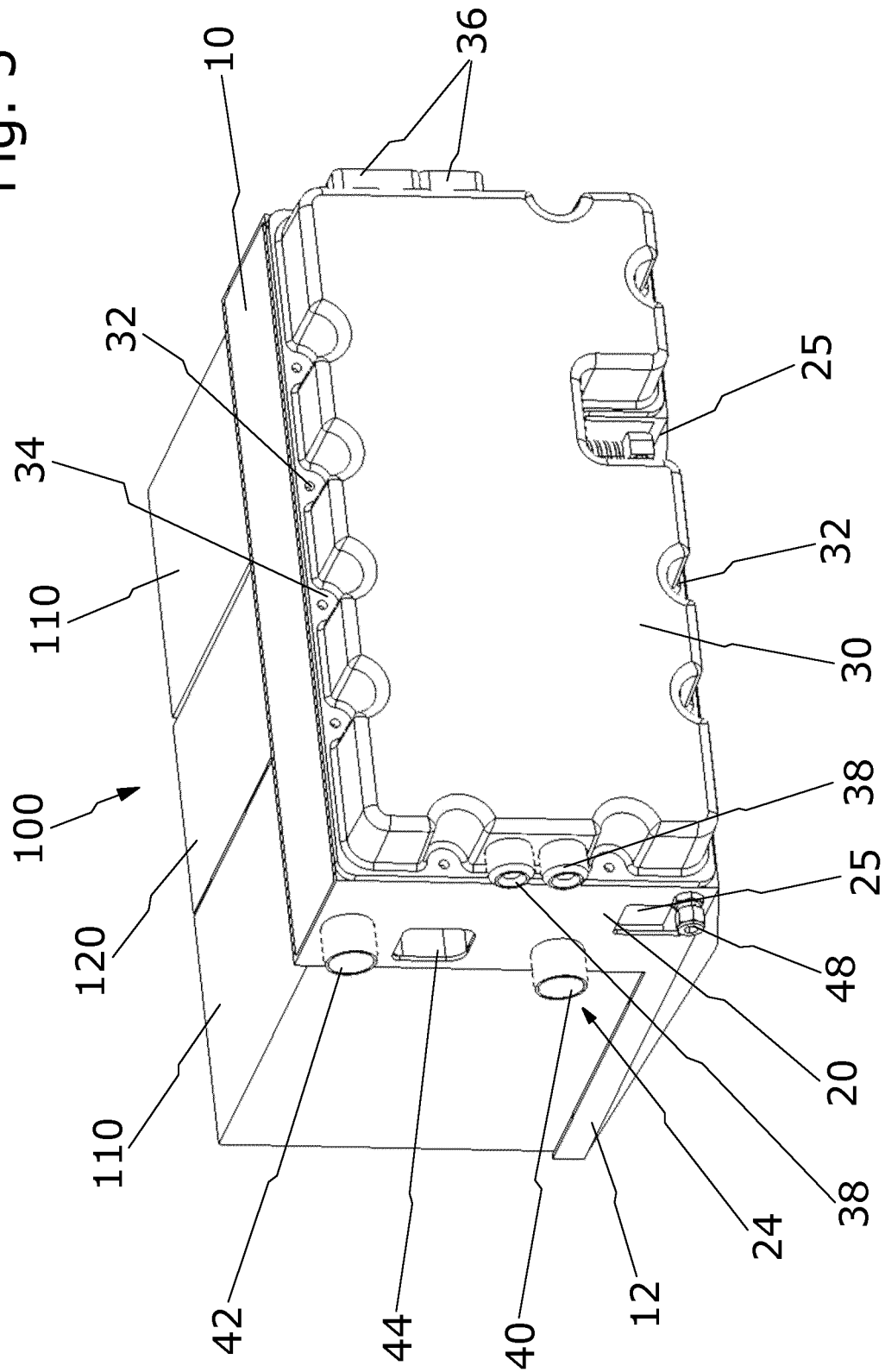
FIG. 5 is a perspective view of a fuel cell system according to an embodiment of the invention.

In more detail, FIG. 5 shows a fuel cell system 100 according to an embodiment of the invention in perspective view. The fuel cell system 100 comprises an integration backplane 10 with a positioning means 12 and a MEI 20 arranged approximately in an L-shape relative to each other. It is advantageous if the positioning means 12 is manufactured in one piece with the MEI 20, e.g. integrally formed by molding, casting, 3D printing or the like.

Two fuel cell modules 110, i.e. one pair of fuel cell modules 110, and an air module 120, are arranged on the positioning means 12. The air module 120 is arranged adjacent to each individual fuel cell module 110. In the embodiment shown, the air module 120 is located in the middle, i.e. between the fuel cell modules 110, but this is not restrictive of the invention.

Although the exemplary embodiment presented explicitly shows two fuel cell modules 110 and one air module 120 arranged in between, the invention is not limited to this. Of course, the MEI 20 according to the invention can be designed to accommodate a larger number of pairs of fuel cell modules 110 and air modules 120 arranged adjacent to each other.

It has been shown that with quite similar external dimensions of the air module 120 and the fuel cell modules 110, a sufficient supply of compressed cooled air to the stacks can be achieved.

FIG. 5 shows the MEI 20 with external media connection ports 24, where in perspective a coolant inlet 40, a coolant outlet 42, an air inlet 44 and a fuel inlet 48 can be seen.

Opposite the fuel cell modules 110 and the air module 120, sometimes also referred to as "modules 110, 120" in the following, a mount 30 is attached to the MEI 20. The mount 30 typically comprises electronic assemblies, in particular DC/AC or DC/DC converters or inverters, power electronics and fuel cell controllers. Electrical lines and data lines from the fuel cell modules 110 to the mount 30 may run through the MEI 20. Corresponding cable openings may be provided in both the MEI 20 and the mount 30 (not shown).

The MEI 20 is thus located between the mount 30 and the modules 110, 120. In the embodiment shown, but not restrictive of the invention, the mount 30 has essentially identical outer dimensions to the MEI 20 in directions $d_1$ and $d_3$, which is best visible in FIG. 6. The essentially cubic outline makes the fuel cell system 100 very compact in its dimensions and particularly suitable for the integration into mobile systems such as vehicles.

The mount 30 is fixed by means of a plurality of fixation means 32, which are arranged in wall recesses 34 of the mount 30. The way the mount 30 is fixed to the MEI 20 can be done in different ways, for example by bolting, welding, riveting or the like. The fixation means 32 are advantageously accessible from a direction perpendicular to the main dimension of the mount 30, i.e. $d_2$. The illustrated mount 30 allows the mount 30 to be removed at the location of the fuel cell system 100, so that the electronic assemblies contained in the mount 30 can be replaced in case of damage.

On the mount 30, a control bus connection port 36 and AV terminals 38 are located on the same side as some of the external media connection ports 24. On the side of the control bus connection port 36, by way of example, as can be seen in FIG. 6, there is an air inlet 44 and an air outlet 46, which are also external media connection ports 24.

FIG. 5 further shows the fuel inlet 48, with a fuel channel inside the MEI 20. On the side of the external media connection ports 24 there is an access window 25, through which the connection of the fuel pipe 72 (depicted in FIG. 13) to the fuel cell module 110 can be established, unmounted and monitored. Another access window 25 is located approximately in the middle of the mounting 30, but slightly offset, to connect the hydrogen pipe to the second fuel cell module 110. The access windows 25 are not symmetrical in relation to the MEI 20, which is not limiting to the invention.

The fuel pipe 72 is usually made of metal. The fuel supply represents a safety-relevant aspect of the system. In order to ensure a leak-proof supply and to check the leakage, direct access to the fuel inlets 48 via access windows 25 is thus advantageous. The connection to the fuel cell module 110 can be made via a fitting 49 (depicted in FIG. 9).

Figure 6:
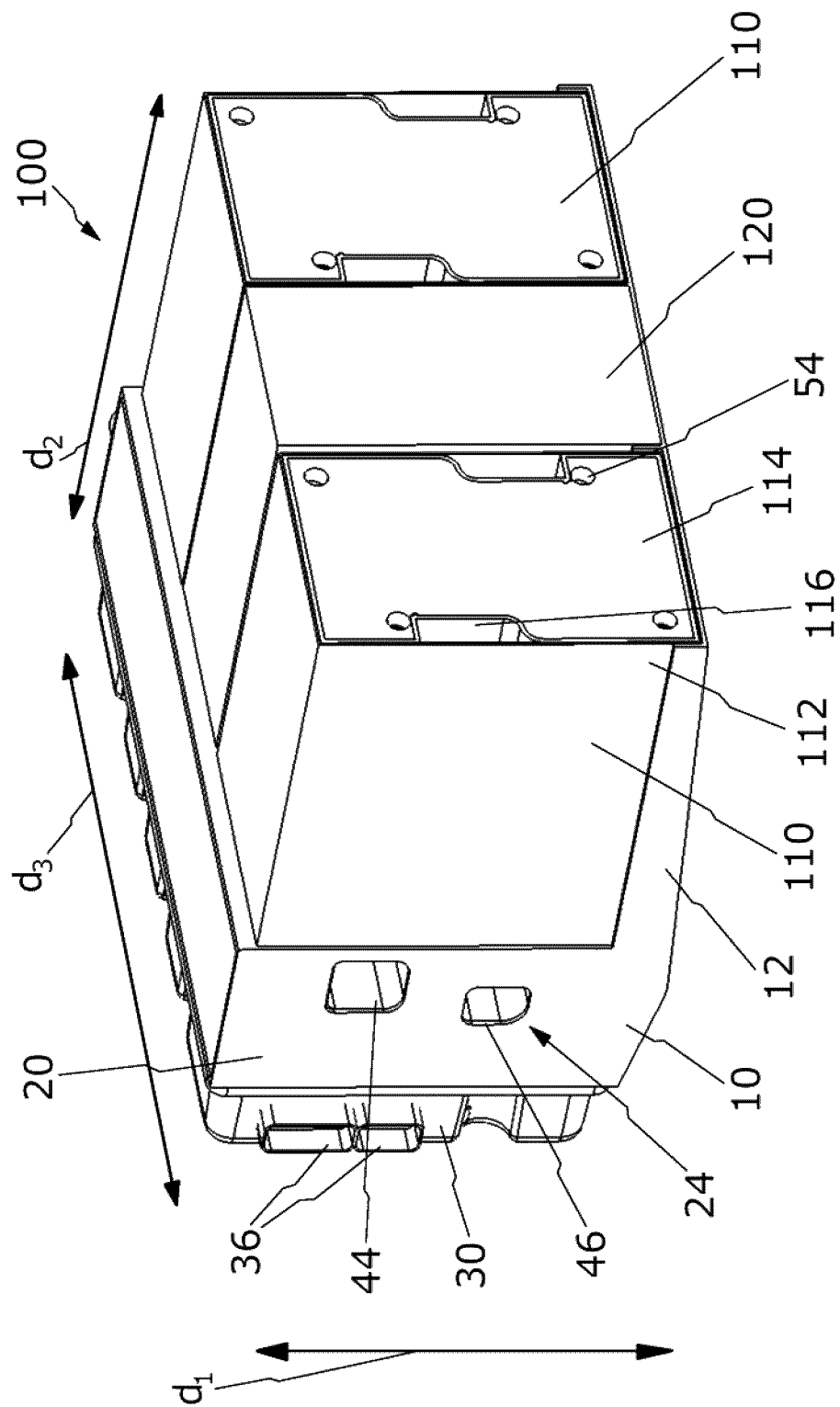
FIG. 6 is another perspective view of the fuel cell system of FIG. 5.

FIG. 6 shows a perspective view of the fuel cell system 100 of FIG. 5 from an opposite direction.

In FIG. 6 the fuel cell modules 110 and the air module 120 can be seen from the rear side, which corresponds to their bottom sides during assembly. The fuel cell modules 110 and the air module 120 are arranged side by side on the positioning means 12 as described with reference to FIG. 5. The positioning means 12 fits with the size of the modules 110, 120 and ends flush with them.

The fuel cell modules 110 are designed as so-called lunchbox-type modules in the exemplary embodiment shown, without, however, restricting the invention. The lunchbox-type modules comprise a bottom assembly 114 nested in a lid cap assembly 112. Between the bottom assembly 114 and the lid cap assembly 112 there are pockets 116 arranged on each of the two long sides of the stack footprint, in which a progressive fixation system can be placed. The progressive fixation system provides for a variable range of compression pressures to the fuel cell stack located in the fuel cell module 110.

The invention is not limited to the various embodiments of the fuel cell stack. The fuel cell stack may comprise a sequence of bipolar plates, MEAs and GDLs, limited by top and bottom end plates for current collection. Alternatively, monopolar plates can be used.

In fuel cell modules of lunchbox-type which are shown in FIG. 6, the so-called stack direction corresponds to direction $d_2$. Accordingly, the individual bipolar plates are arranged vertically in the drawing plane and run essentially parallel to the main dimensions $d_3$ and $d_1$ of the MEI 20. When installed in a vehicle, for example, this arrangement makes advantageous use of the gravitational effect on the molecules participating in the chemical reaction, e.g. water droplets passing through the fluid channels of the bipolar plates. The water droplets will tend to fall to their outlet, which is the air outlet 46 in most embodiments.

Mounting points 54 are located in the area of the bottom assembly 114 of the fuel cell module 110, whereby four mounting points 54 per fuel cell module 110 are provided here as an example, but not as a limitation to the invention. Two of the mounting points 54 are located in the corners of the bottom assembly 114, and two more of the mounting points 54 are located, by way of example, in the area of the pockets 116 of the fuel cell modules 110. Of course, various other arrangements can be there, in particular arrangements involving more or less than four mounting points 54.

Figure 7:
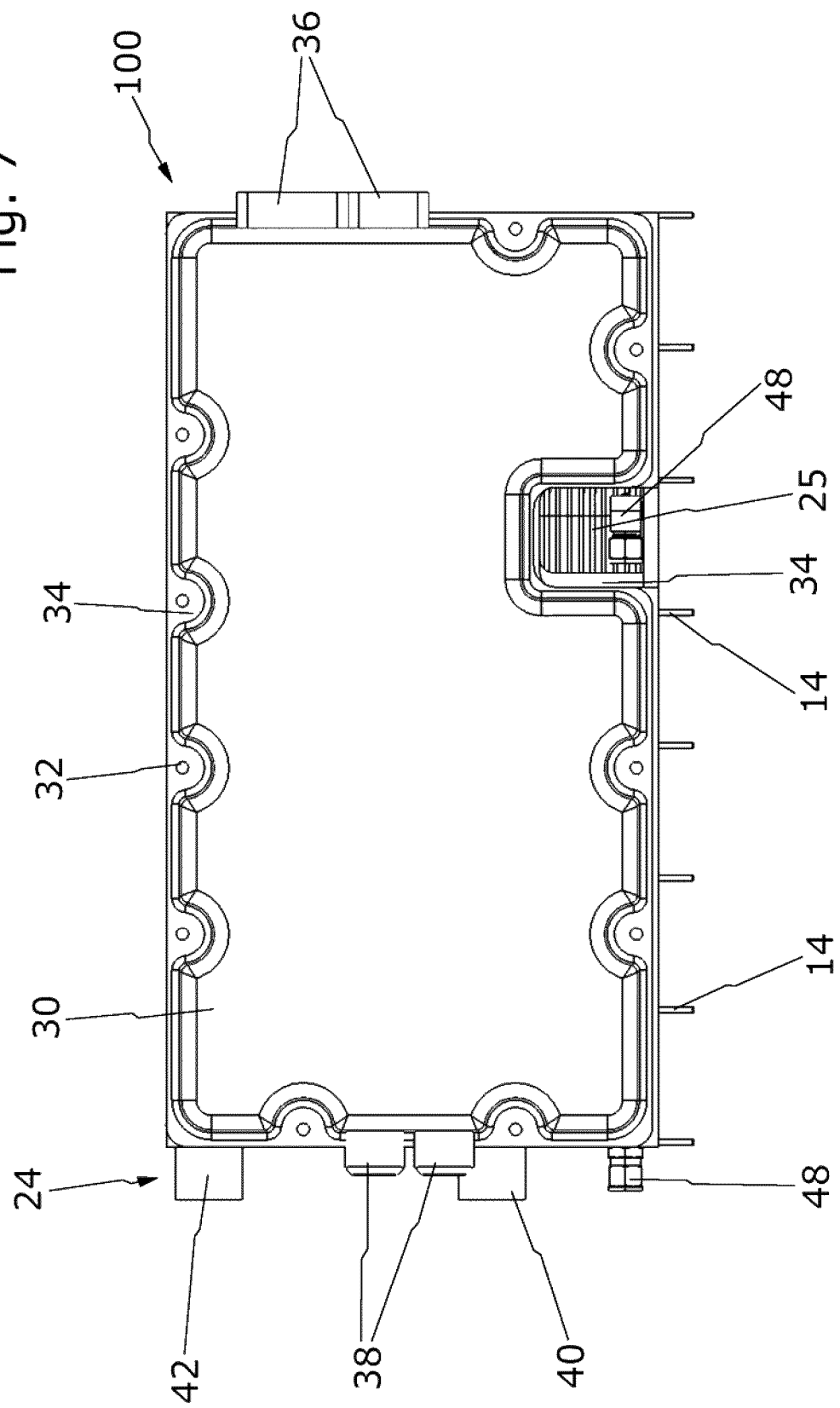
FIG. 7 is a rear side view of the fuel cell system of FIG. 5.

FIG. 7 shows a top view of the integration backplane 10 with mount 30 in the foreground. There is a large recess 34 in mount 30 for the access window 25 to the fuel inlet 48 in its lower area. On the bottom side, stiffening ribs 14 are arranged, which run along the positioning means 12.

The stiffening ribs 14 are designed to absorb shocks and vibrations. They serve to stiffen the integration backplane 10 and protect the fuel cell modules 110 from mechanical shocks.

Figure 8:
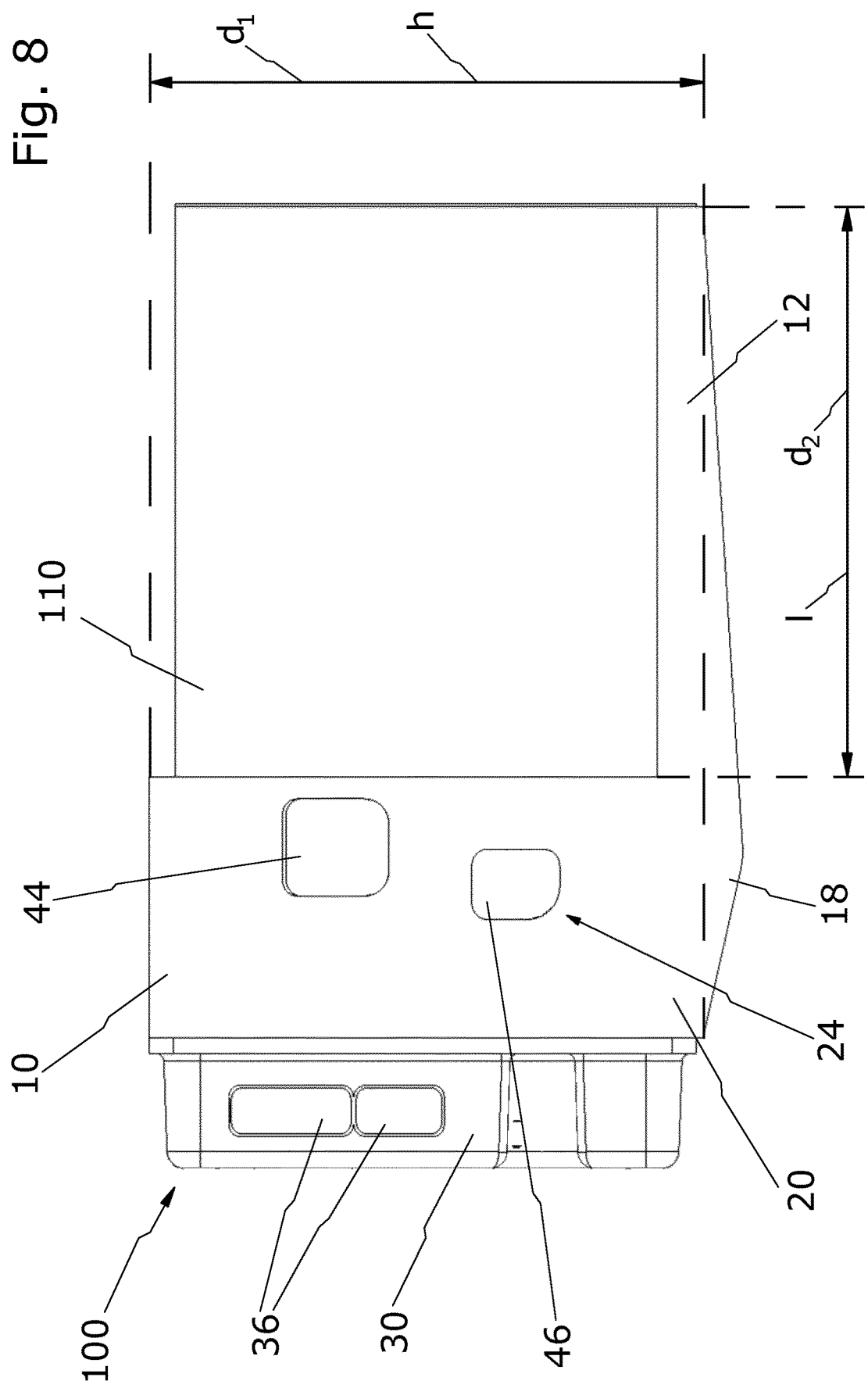
FIG. 8 is a side view of the fuel cell system of FIG. 5.
Figure 9:
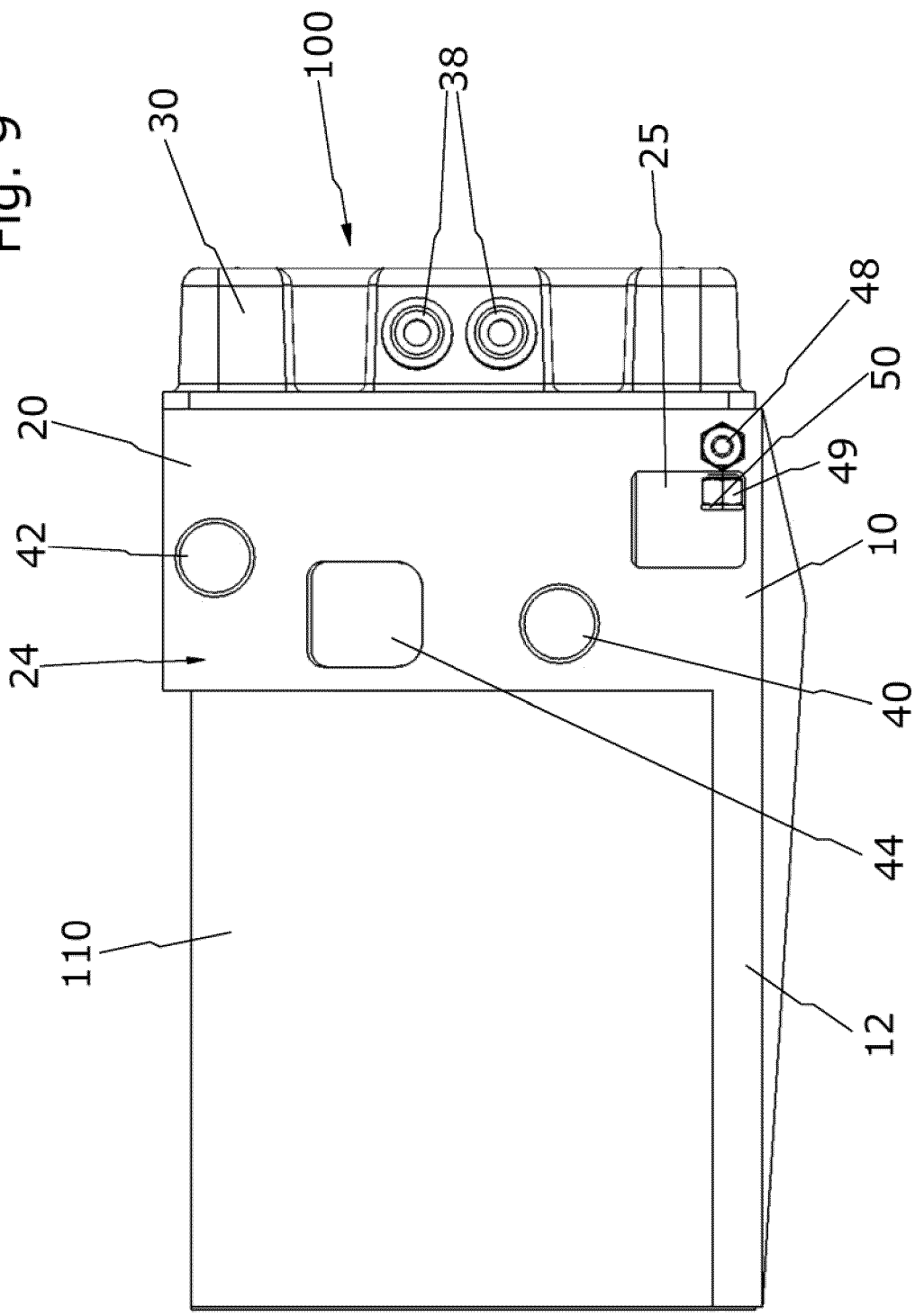
FIG. 9 is another side view of the fuel cell system of FIG. 5.

In FIG. 8, the side view of fuel cell system 100 shows that the stiffening ribs 14 do not protrude evenly over the length l of positioning means 12, but may be shaped like a wedge heel 18.

The wedge heel 18 represents only one possible embodiment of the layout of the underside of the integration backplane 10. The embodiment shown simply has the advantage that the fuel cell modules 110 are operated in a slightly inclined position, which may improve the flow of media such as air and fuel through the fuel cell stack. In other embodiments, the stiffening ribs 14 may run evenly. In embodiments, where no such wedge heel 18 is provided, the fuel cell modules 110 can be operated essentially horizontally, and the fuel stacks can be operated with vertical alignment of the bipolar plates. Thus, by dimensioning the wedge heel 18, the orientation of the stack can be adapted such that the orientation of the individual fuel cell modules 110 can be adjusted such that the most desirable orientation with the direction of the force of gravity is achieved.

FIG. 8 also shows that the MEI 20 has essentially the same height h as the modules 110, 120, so that, disrespecting the wedge heel 18, an essentially cuboid-shaped overall external outline of the fuel cell system 100 is achieved.

With reference to FIGS. 10 and 11 some module connection ports 22 and connection means 52 will be explained.

FIG. 10 shows a front view of the fuel cell system 100 as described with reference to the previous figures. The two fuel cell modules 110 are not shown, only the air module 120 is arranged on the positioning means 12.

The module connection ports 22 are identical for each of the fuel cell modules 110. Thus, they allow identical fuel cell modules 110 to be connected.

An area for the module connection port 22 for one of the modules 110, 120 is represented by reference sign 23. The specific positions of the connection ports 22 is not limiting the invention.

The module connection ports 22 comprise a coolant inlet 40 and a coolant outlet 42, which are provided at diametrically opposite corners of the respective region of the module connection area 23. The module connection ports 22 further comprise an air inlet 44 and an air outlet 46, which are also located on opposite sides of the region of the module connection area 23. Centrally located in the module connection area 23, there are connection means 52 for connection to the corresponding current collectors provided at the fuel cell modules 110. In some embodiments, the connection means 52 can also be used to operate or control sensors which may be present in the modules 110, 120. The module connection ports 22 further include the fuel outlet 50.

For data lines and sensor lines, a control bus connection port 36 is provided. Via control bus connection port 36 data and sensor signals from the modules 110, 120 may be transmitted to the corresponding control buses or control devices in mount 30.

Two mounting points 54 are provided for each fuel cell module 110, which are arranged diametrically opposite each other, enabling the fuel cell module 110 to be attached quickly and easily to the MEI 20.

In FIG. 11, compared to FIG. 10, the air module 120 has also been removed so that the module connection ports 22 for the air module 120 are visible. The module connection ports 22 for the air module 120 include an air outlet 46 and an air inlet 44, which are located at the same distance from the footprint areas 13 of the fuel cell modules 110.

In some embodiments, an intercooler 126 is provided in the air module 120, see FIGS. 16 to 18. Correspondingly, the module connection ports 22 for the air module 120 include a coolant inlet 40 and a coolant outlet 42 which are to be connected to the intercooler 126 in the air module 120.

For the operation of the compressors 124 in the air module 120, see FIGS. 16 to 18, a connection means 52 provides the power supply. The connection means 52 can also be used to operate or control sensors which may be present in the air module 120.

In FIG. 11, the positioning means 12 is also more clearly visible, as modules 110, 120 are not shown. The positioning means 12 comprises the footprint areas 13 for the modules 110, 120, with the footprint areas 13 being limited by guide rails 16. The guide rails provide a positioning aid for the module connection ports 22. In the rear area, the footprint areas 13 are directly limited by the MEI 20. In the front area, the footprint areas 13 are seamless. In this way, modules 110, 120 can be easily connected or disconnected individually to/from the integration backplane 10.

FIG. 12 shows the interior of the MEI 20, in particular to indicate some media manifold channels 27 in connection with the invention. The media manifold channels 27 include coolant manifolds 70 and an air manifold 80.

In FIG. 12, a first coolant manifold 70 is provided in the upper part of the MEI 20 and a second coolant manifold 70 in the lower part of the MEI 20. The coolant manifolds 70 have coolant inlets 40 and coolant outlets 42 on the side of the MEI 20, which have already been described with reference to the previous figures. In the area of the module connection ports 22, coolant outlets 42 and coolant inlets 40 for the individual fuel cell modules 110 branch off from coolant manifold 70.

Not shown, but included in some embodiments, another coolant inlet 40 and another coolant outlet 42 can be placed in the middle of the MEI 20 for supplying the intercooler 126 in the air module 120 with coolant.

The air manifold 80 is located between the coolant manifolds 70. The air manifold 80 comprises the air inlet 44 and air outlet 46 already described with reference to the previous figures.

In the embodiment shown, the air manifold 80 comprises two air inlets 44 on both sides of the MEI 20. This reduces the noise level and allows air manifold 80 with a smaller diameter to be used. The air manifold 80 is essentially T-shaped, with the air outlet 46 lower than the two air inlets 44, which is sometimes also referred to as a through. The two air inlets 44 are provided at the same height. This specific air routing prevents the build-up of standing waves in the air manifold 80 and prevents or, at least, reduces noise.

Starting from the air manifold 80 and following the air flow during use, the air outlet 46 is thus provided in the central area of the MEI 20 for connection to the air module 120, and an air inlet 44 is provided to supply the compressed air provided by the air module 120 to a humidifier 26.

As can be more clearly seen from FIG. 13, the humidifier 26 is located in the middle of the MEI 20 between the positions for the fuel cell modules 110 and opposite the position of the air module 120. From the humidifier 26, the wet compressed air is guided to the fuel cell modules 110.

Corresponding to the air inlets 44 and air outlets 46 of the module connection area 23 of the fuel cell modules 110, there are air outlets 46 and air inlets 44 on the top and bottom sides of the MEI 20, which are arranged symmetrically to one another, in particular mirror-symmetrically with respect to a longitudinal axis through the MEI 20, the longitudinal axis being shown in FIG. 6 as axis $d_1$.

In more detail, FIGS. 12 and 13 show air passages 60, 62, 64, 66, 68 through the MEI 20.

A first air passage 60 runs from the air inlet 44 of the air manifold 80 to the air outlet 46 for connection to the air module 120. The compressed air from the air module 120 is fed through the air inlet 44 via the second air passage 62 to the humidifier 26, as can be seen especially well in FIG. 13.

After passage and humidification through the humidifier 26, the compressed wet air is fed via a third air passage 64 to the air outlets 46 for connection to the fuel cell modules 110. As shown in FIG. 13, in the third air passage 64 the airflow is divided by an airflow divider 82.

The depleted wet air from the fuel cell modules 110 is returned to the humidifier 26 via fourth air passages 66, where it meets the external air and can be humidified additionally.

In a fifth air passage 68, the excess air from the humidifier 26 is discharged from the MEI 20 at another air outlet 46. In the embodiment shown, the return of excess air takes place only in one lateral direction, which is, however, not restrictive for the invention. A symmetrical air discharge can of course be provided.

It is advantageous to position the air module 120 between the pair of fuel cell modules 110. Since the air module 120 is located between the two fuel cell modules 110, the duct lengths for air passages 60, 62, 64, 66, 68 are ideally short. This allows a very low pressure drop of the air generated by the compressor 124 of the air module 120 over the MEI 20 and integration backplane 10.

As can be seen in particular in FIG. 5, the air module 120 has a smaller width than the fuel cell modules 110. The width is thus explicitly deviated from the module dimension, so that the fuel cell modules 110 and the air module 120 are not interchangeable. These dimensions may be optimized by the skilled person so that the shortest possible duct length can be obtained for air passages 60, 62, 64, 66, 68.

Furthermore, since also the humidifier 26 is arranged between the two fuel cell modules 110 and facing the air module, 120, the duct lengths for air passages 60, 62, 64, 66, 68 are ideally short. This also contributes to the very low pressure drop of the air generated by the compressor 124 of the air module 120 over the MEI 20 or integration backplane 10.

In FIG. 13, it is also visible that the fourth air passage 66 for the discharge of the depleted air from the fuel cell modules 110 to the humidifier 26 comprises a first bending section 84, followed by a flow cross-section change section 88, and followed by a second bending section 86. The first bending section 84 is essentially L-shaped and deflects the depleted air of the fuel cell modules 110 by 90 degrees. In the second bending section 86, the airflow is further deflected by 90 degrees towards the humidifier 26, which is located centrally in the MEI 20.

Between the first bending section 84 and the second bending section 86, airflow with a rectangular cross-section is changed into airflow with a circular cross-section. A tapered component is provided for this purpose, which is not restrictively referred to as flow cross-section change section 88.

Correspondingly, bends or throughs can be provided in all air passages 60, 62, 64, 66, 68 so that straight, uncovered airflow channels are not used. This reduces the formation of standing waves and the associated disturbing noise.

FIG. 13 shows a system bypass valve 28 as a further element from the balance-of-plant. Alternatively or additionally, other balance-of-plant components from the anode path, from the cathode path and from the cooling circuit may be provided.

FIG. 14 shows an exemplary embodiment of the air module 120 in perspective view. The housing 122 of the air module 120 is correspondingly cuboidal. The air module 120 may thus be suitably accommodated in the integration backplane 10 by the positioning means 12 provided by the invention. The module connection ports 22 of the air module 120 are compatible with the respective module connection ports 22 of the MEI 20.

In comparison to the module connection ports 22 for the air module 120 described with reference to FIG. 11, the embodiment shown in FIGS. 14 to 16 provides for the coolant inlet 40 and coolant outlet 42 to be split up for the individual components in the air module 120. Thus, FIG. 14 and FIG. 11 refer to different embodiments as will readily be understood by the person skilled in the art. The invention is, however, not limited to these embodiments.

FIGS. 15 and 16 show that the air module 120 includes a compressor 124, an intercooler 126 and a power electronics assembly 128. For the compressor 124 and the power electronics assembly 128 a first coolant inlet 40 and a first coolant outlet 42 are provided, which are located in the middle area of the front side of the air module 120 in FIG. 14. For the intercooler 126 a second coolant inlet 40 and a second coolant outlet 42 are provided in the corner areas of the air module 120. As shown in FIG. 15, the coolant is supplied via a coolant passage 130 inside the housing 122 to the intercooler 126 and via a further coolant passage 130 to the coolant outlet 42.

LIST OF REFERENCE SIGNS 10 integration backplane
12 positioning means
13 footprint area
14 stiffening rib
16 guide rail
18 wedge heel
20 media and electrical interface (MEI)
22 module connection port 23 module connection area
24 external media connection port
25 access window
26 humidifier
27 media manifold
28 system bypass valve
30 mount
32 fixation means
34 wall recess
36 control bus connection port
38 HV terminal
40 coolant inlet
42 coolant outlet
44 air inlet
46 air outlet
48 fuel inlet
49 fitting
50 fuel outlet
52 connection means
54 mounting point
60-68 air passages
70 coolant manifold
72 fuel pipe
80 air manifold
82 airstream divider
84, 86 bending sections
88 flow cross-section change section
100 fuel cell system
110 fuel cell module
112 lid cap assembly
114 bottom assembly
116 pocket
120 air module
122 housing
124 compressor
126 Intercooler
128 power/electronics assembly
130 coolant passage
132, 134 air passages

The invention claimed is:

1. An integration backplane for holding at least one pair of fuel cell modules and at least one air module,
said integration backplane being provided with a positioning means for the pair of fuel cell modules and for the air module, such that the air module can be arranged in a symmetric position between the fuel cell modules of the pair of fuel cell modules, and
said integration backplane being further provided with a media and electrical interface,
wherein the media and electrical interface includes module connection ports for connecting to the fuel cell modules and the air module, and
wherein the media and electrical interface includes first air passages for the routing of air to the air module, module connecting air passages for the routing of compressed air from the air module to the fuel cell modules, and evacuation air passages for the evacuation of depleted air from the fuel cell modules.

2. The integration backplane as claimed in claim 1,
wherein the media and electrical interface provides a housing for at least one humidifier, and
wherein the module connecting air passages include second air passages for the routing of compressed air from the air module to the humidifier and third air passages for the routing of humidified compressed air to the fuel cell modules.

3. The integration backplane as claimed in claim 2,
wherein the evacuation air passages include fourth air passages for the routing of depleted wet air from the fuel cell modules to the humidifier and fifth air passages for the evacuation of excess air from the humidifier.

4. The integration backplane as claimed in claim 3,
wherein the second air passages, the third air passages, the fourth air passages and the fifth air passages e symmetrical with respect to the positions of the fuel cell modules.

5. The integration backplane as claimed in claim 2, wherein the humidifier is arranged between the positions for the fuel cell modules and facing the position of the air module.

6. The integration backplane as claimed in claim 1, wherein at least one of the air passages of the media and electrical interface is shaped to provide silencer functions.

7. The integration backplane as claimed in claim 1, wherein the media and electrical interface comprises external media connection ports, the external media connection ports including a coolant inlet, a coolant outlet, an air inlet, an air outlet and a fuel inlet.

8. The integration backplane as claimed in claim 1, wherein the media and electrical interface includes connection means for the current collection of the fuel cell modules, the connection means optionally being arranged at the same side as the module connection ports.

9. The integration backplane as claimed in claim 1, the integration backplane being provided with a mount,
wherein the mount includes power electronics for the operation of one or several compressors including for operation of a compressor of the air module, and
wherein the mount includes a power conversion device, wherein the power conversion device is a DC/AC converter or DC/DC converter, the power conversion device being connectable to current collection means of the fuel cell modules either individually or via a common rail, and/or
wherein the mount includes at least one fuel cell control unit for monitoring at least one operation parameter of the fuel cell modules.

10. The integration backplane as claimed in claim 1, wherein the media and electrical interface includes coolant manifolds for the routing of a coolant to and from the fuel cell modules.

11. The integration backplane as claimed in claim 1, wherein the media and electrical interface includes fuel pipes for the routing of a hydrogen fuel to the fuel cell modules and an interface for coupling with a hydrogen fuel tank outlet valve.

12. The integration backplane as claimed in claim 1, wherein the media and electrical interface provides a housing for a system bypass valve which can be controlled such that each fuel cell module individually, or the pair of fuel cell modules can be deactivated.

13. A fuel cell system having the integration backplane as claimed in claim 1 and having at least two fuel cell modules and at least one air module arranged on the positioning means and connected to the media and electrical interface.

14. The fuel cell system as claimed in claim 13, wherein the air module comprises a compressor and optionally an intercooler.

15. The fuel cell system as claimed in claim 13, wherein the fuel cell modules are of a lunchbox type and of identical outer dimensions.

* * * * *